(12) United States Patent
Carlomagno

(10) Patent No.: US 8,028,543 B2
(45) Date of Patent: Oct. 4, 2011

(54) TEMPERING BENT GLASS SHEETS

(75) Inventor: Giovanni Maria Carlomagno, Naples (IT)

(73) Assignee: Pilkington PLC, St. Helens, Merseyside (GB)

( * ) Notice: Subject to any disclaimer, the term of this patent is extended or adjusted under 35 U.S.C. 154(b) by 1120 days.

(21) Appl. No.: 10/551,117

(22) PCT Filed: Mar. 25, 2004

(86) PCT No.: PCT/GB2004/001263
§ 371 (c)(1), (2), (4) Date: Sep. 28, 2005

(87) PCT Pub. No.: WO2004/085326
PCT Pub. Date: Oct. 7, 2004

(65) Prior Publication Data
US 2006/0191292 A1    Aug. 31, 2006

(30) Foreign Application Priority Data
Mar. 28, 2003 (EP) .................................. 03425197

(51) Int. Cl.
C03B 27/04 (2006.01)
C03B 27/044 (2006.01)
C03B 27/048 (2006.01)
(52) U.S. Cl. .............. 65/348; 65/104; 65/114; 65/182.2
(58) Field of Classification Search .................... 65/114, 65/348, 161, 194, 204, 29.1, 29.19, 111, 65/355
See application file for complete search history.

(56) References Cited

U.S. PATENT DOCUMENTS

| | | | | |
|---|---|---|---|---|
| 2,921,411 | A | * | 1/1960 | Black .............................. 65/348 |
| 3,125,430 | A | | 3/1964 | Richardson |
| 3,388,984 | A | | 6/1968 | Leflet, Jr. et al. |
| 3,457,057 | A | * | 7/1969 | Gardon ........................... 65/114 |
| 3,873,295 | A | | 3/1975 | Bates et al. |
| 4,297,121 | A | * | 10/1981 | Rhonehouse .................. 65/348 |

(Continued)

FOREIGN PATENT DOCUMENTS
GB    726094    3/1955
(Continued)

OTHER PUBLICATIONS
Machine Translation of JP 2000-247663.*
(Continued)

*Primary Examiner* — Matthew Daniels
*Assistant Examiner* — Cynthia Szewczyk
(74) *Attorney, Agent, or Firm* — Buchanan Ingersoll & Rooney PC

(57) ABSTRACT

An apparatus for tempering a bent glass sheet is disclosed. The apparatus comprises means for conveying the sheet through the apparatus and a pair of blastheads for quenching the sheet with quench gas. Each blasthead comprises a plurality of spaced elongate plenums for supplying quench gas to an array of quench nozzles, the nozzles being mutually inclined to provide diverging jets of quench gas. The plenums extend transversely to the direction of conveyance of the sheet, and the array of nozzles is curved in at least one direction. The array may comprise rows of nozzles extending along lines which are curved in the direction of elongation of the plenums; preferably the curvature of the rows matches the average local curvature of the bent glass sheet in the corresponding direction. Also disclosed is a production line incorporating the apparatus.

19 Claims, 5 Drawing Sheets

U.S. PATENT DOCUMENTS

| | | | |
|---|---|---|---|
| 4,381,933 A | 5/1983 | Schultz et al. | |
| 4,515,622 A * | 5/1985 | McMaster et al. | 65/351 |
| 4,711,655 A * | 12/1987 | Schultz | 65/351 |
| 4,816,058 A | 3/1989 | Kuster et al. | |
| 4,888,038 A | 12/1989 | Herrington et al. | |
| 5,273,568 A | 12/1993 | McMaster et al. | |
| 5,507,852 A * | 4/1996 | Frank et al. | 65/348 |
| 5,917,107 A | 6/1999 | Ducat et al. | |
| 6,339,941 B1 | 1/2002 | Bremer | |
| 2006/0277947 A1* | 12/2006 | Funk et al. | 65/182.2 |

FOREIGN PATENT DOCUMENTS

| | | | |
|---|---|---|---|
| JP | 2000247663 A * | 9/2000 | |
| WO | 99/26890 A1 | 6/1999 | |
| WO | 00/23387 | 4/2000 | |

OTHER PUBLICATIONS

European Search Report dated Aug. 28, 2003.

* cited by examiner

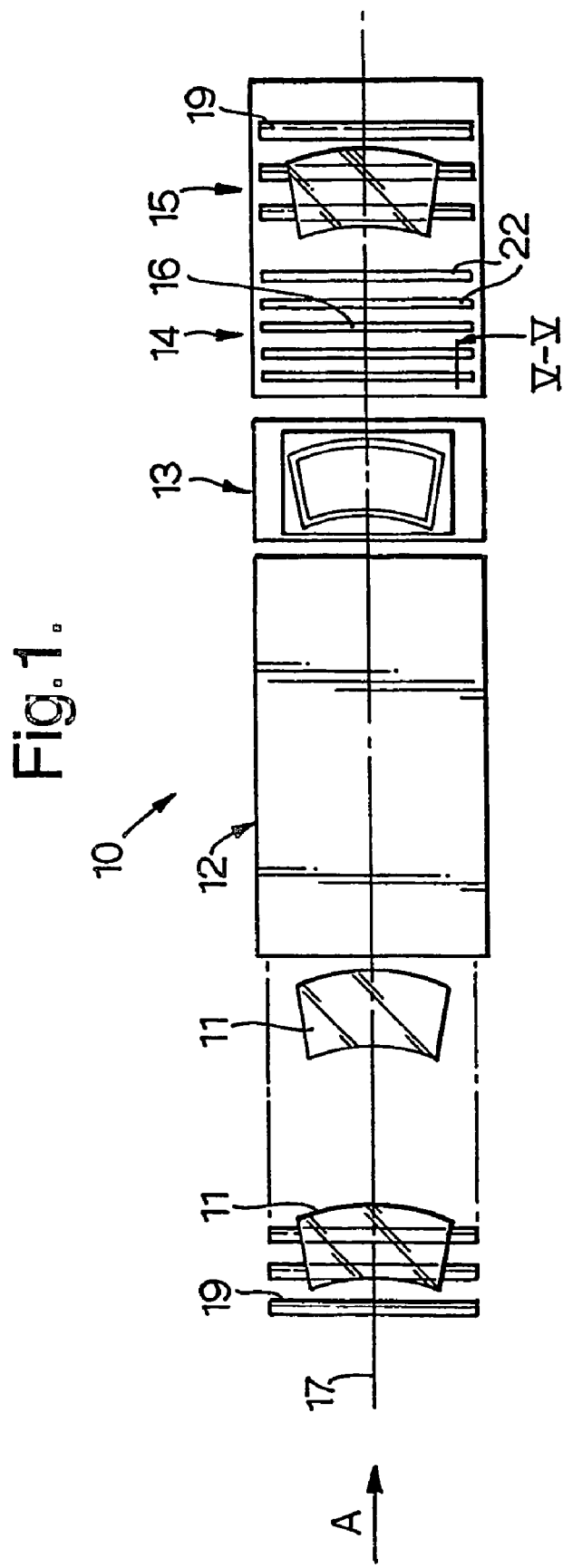

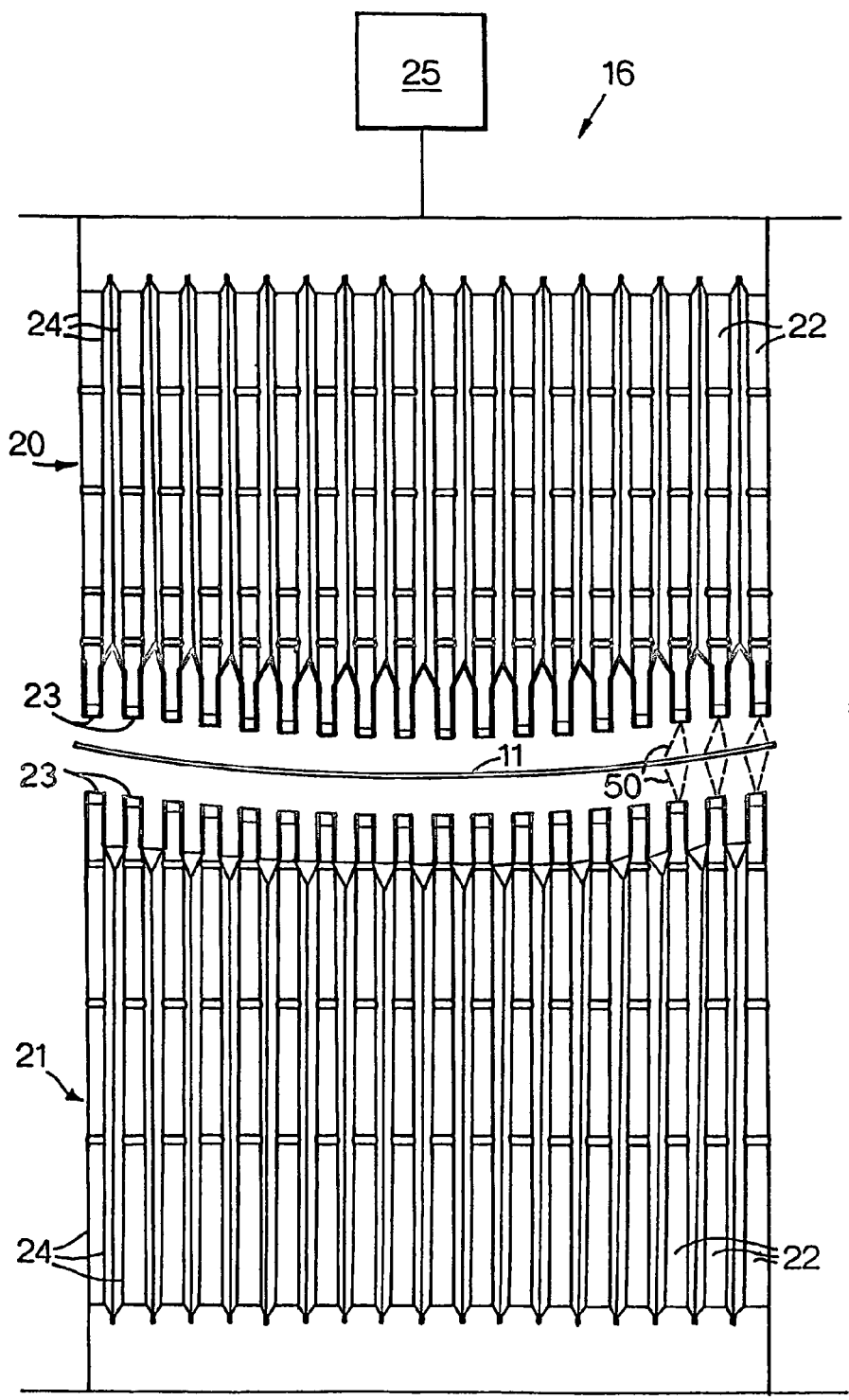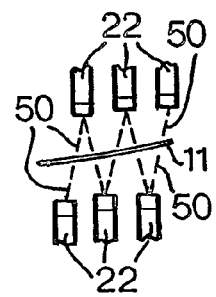

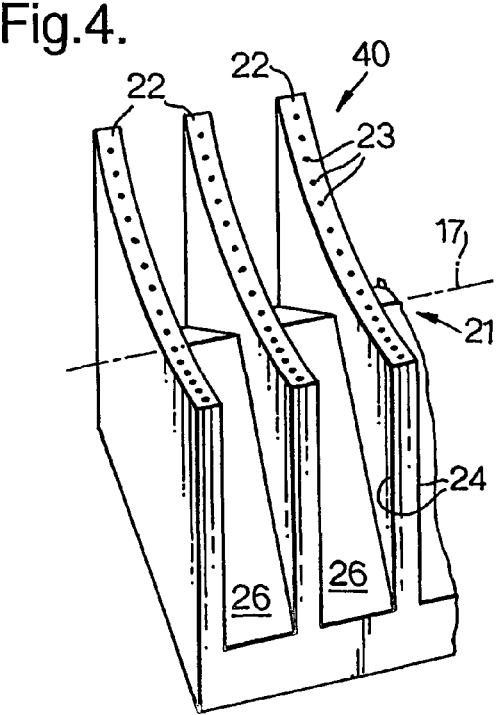
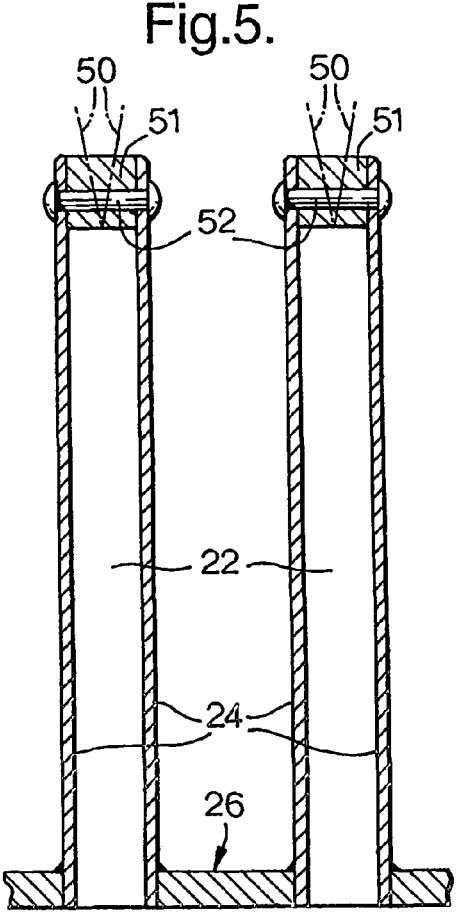
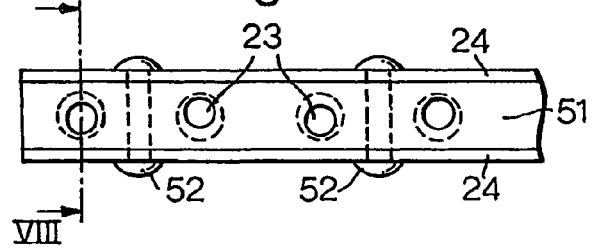
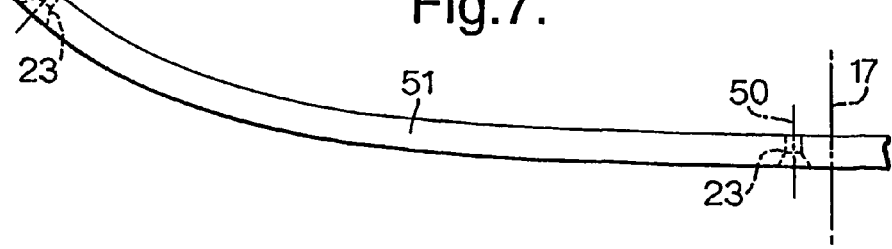

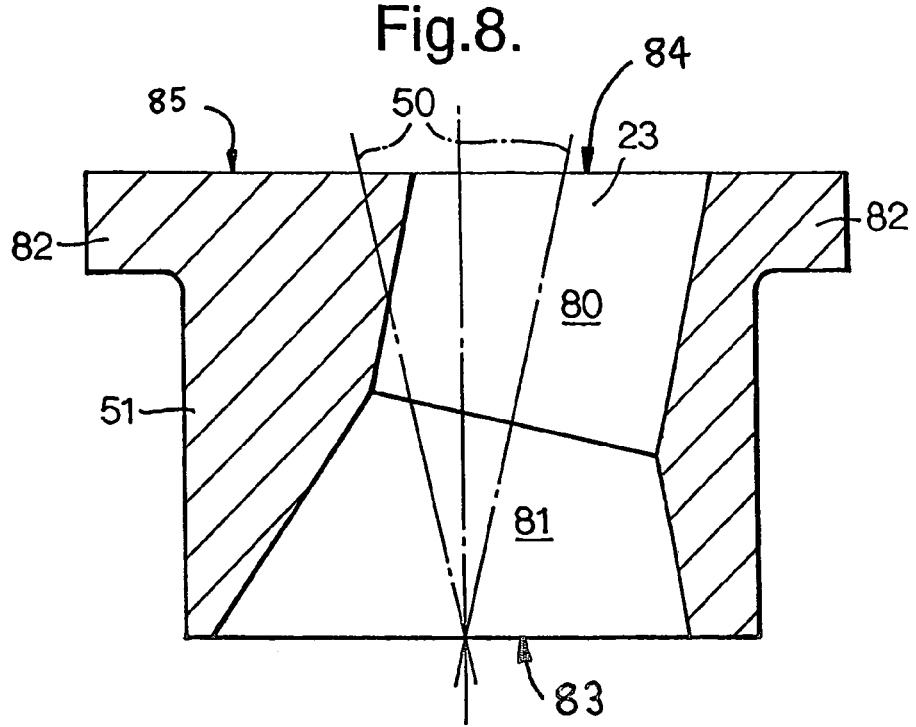
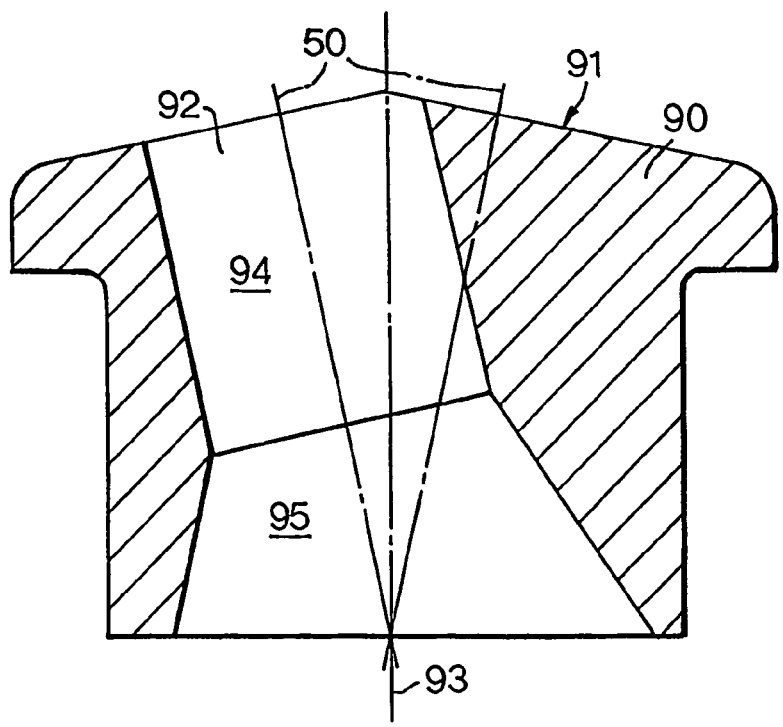

TEMPERING BENT GLASS SHEETS

This application is the U.S. National Stage Application under 35 U.S.C. §371 of International Application No. PCT/GB2004/001263, filed on Mar. 25, 2004 designating the U.S., and claims priority under 35 U.S.C. §119 with respect to European Application No. 03425197.5, filed on Mar. 28, 2003, the entire contents of both of which are hereby incorporated by reference.

The present invention relates to an apparatus and method for tempering bent glass sheets, and more particularly to such an apparatus and method in which a bent glass sheet is tempered by quenching it with jets of quench gas. The apparatus comprises a means of conveying the sheet along a predetermined path through the apparatus, and a pair of blastheads for quenching the sheet with jets of quench gas, the blastheads comprising upper and lower blastheads arranged in opposed relationship above and below the predetermined path, each blasthead comprising a plurality of elongate plenums for supplying quench gas to an array of quench nozzles from which the jets of quench gas issue. The bent and tempered glass sheets produced by the apparatus and method of the invention may be employed as vehicle glazings, in particular as automotive glazings.

WO 99/26890 discloses an apparatus and method for forming heated glass sheets, including a quench station. Insofar as this specification and the related U.S. Pat. No. 5,917,107 describe the quench station, they are primarily concerned with a quench station loader for installing a set of upper and lower quench modules.

U.S. Pat. No. 5,273,568 discloses a quench station for quenching a heated glass sheet conveyed on a roller conveyor. The patent addresses difficulties arising from the obstruction effect of the conveyor rolls on the jets of quenching gas and the differing quench configurations which this causes for the upward and downward-facing surfaces of the glass sheet.

WO 00/23387 (corresponding to U.S. Pat. No. 6,295,842) discloses a glass sheet quench unit and method for quenching formed glass sheets by quench gas jets that define a uniformly repeating gas jet impingement pattern. Said pattern is an equilateral triangular pattern providing uniformly repeating quench cells of equilateral hexagonal shape distributed over the formed glass sheet. The resultant product is a quenched glass sheet in which the glass stresses are uniformly distributed in its thickness. The gas jets are distributed from perforated metal strips which are roll formed to the desired curved shape.

Unfortunately, the gas jets produced by this apparatus are poorly defined, and do not provide good heat transfer unless the perforated metal strips are placed very close to the glass sheets, which produces optical distortion, and gives practical problems in operation. Furthermore, the uniform stresses produced by the uniform quench pattern have been found to yield excessively long splines on fracture, which results in the quenched glass sheet not meeting the required safety standards for vehicle windows.

U.S. Pat. No. 4,515,622 discloses quench apparatus for tempering both flat and bent glass sheets, the latter being used for vehicle windows. The apparatus comprises opposed blastheads, each including elongated plenum housings provided with spaced openings which are oriented to supply angular jets of quench gas towards a heated glass sheet. The embodiments intended for bent glass sheets (illustrated in FIGS. 5, 6 and 8) comprise a glass bending and tempering system including a furnace, a bending station and a quench station. The bending station (designated 62 in FIG. 5) is of the "side exit" type, that is to say, the directions of movement of a glass sheet on entering and exiting the bending station are at right angles to each other. Furthermore, from consideration of the elevation view of FIG. 6 in relation to FIG. 5 on which it is based, it is apparent that the elongated plenum housings designated 34 are oriented parallel to the direction in which glass sheets advance from the bending station 62 to the quench station 14'.

However, a number of disadvantages are linked to this arrangement. During quenching, the spent quench gas is in part channelled towards the bending station by the plenums. This has the unwelcome effect of cooling the glass sheet and bending apparatus at a stage in the process where it is critical to maintain the elevated temperature which is imparted to the glass sheet in the furnace to achieve satisfactory bending and tempering. Indeed, the cooling effect of the quench gas may even extend to the final sections of the furnace, reducing the thermal efficiency of the system. Also, as can be seen from FIG. 6 of U.S. Pat. No. 4,515,622, the plenums converge in an upward direction, so that there is considerably less space between the plenums of the upper blasthead than the lower blasthead. Additionally, the amount of space decreases in an upward direction away from the glass sheet. This arrangement of plenums means that dispersal of spent quench gas (referred to as "air release" for short, as the quench gas is normally air) on the upper side of the glass sheet is restricted, resulting in a less efficient operation.

Moreover, it is inevitable that occasionally a glass sheet will break in the quench station, and the resulting fragments of broken glass ("cullet") must be removed to reduce the risk of scratching of subsequent glass sheets passing through the quench station, and eventual blockage of the apparatus. In the apparatus of U.S. Pat. No. 4,515,622, access for removal of cullet from between the plenums is only possible from along the line, i.e. from the upstream side through the bending station, or from the downstream side of the quench station, where an unloading station or other apparatus would normally be present. In either case access is restricted, and this makes cullet removal slow and laborious.

The above disadvantages would still apply to the quench apparatus of FIGS. 5, 6 and 8 of U.S. Pat. No. 4,515,622 even if it were re-arranged so that the furnace, bending station and quench were in line with each other.

It is important to be aware that vehicle manufacturers continue to strive to reduce the weight of vehicles in the interests of improved fuel economy, and so interest continues in reducing the thickness of the glazings in the vehicle. This in turn requires that the glass manufacturer develop techniques for tempering ever thinner bent glass sheets to the requisite international safety standards.

It would be desirable to provide a production line for tempering bent glass sheets, which not only alleviated the disadvantages of the known apparatus outlined above, but also allowed thinner sheets to be tempered efficiently.

According to the present invention, there is provided an apparatus for tempering a bent glass sheet, comprising a means of conveying the sheet along a predetermined path through the apparatus, and a pair of blastheads for quenching the sheet with jets of quench gas, the blastheads comprising upper and lower blastheads arranged in opposed relationship above and below the predetermined path, each blasthead comprising a plurality of spaced elongate plenums for supplying quench gas to an array of quench nozzles from which the jets of quench gas issue, the length of the quench nozzles exceeding their diameter, and the quench nozzles of each plenum being mutually inclined to provide diverging jets of quench gas, characterised in that the plenums extend transversely to the direction of conveyance of the bent glass sheet and the array of quench nozzles is curved in at least one direction.

The array of quench nozzles may be regarded as extending over a curved surface and comprising rows of nozzles in at least one direction.

Arranging the plenums transversely allows the spent quench gas to exhaust to the sides of the production line, where it has no disadvantageous effect on other parts of the line. The plenums may then be arranged in parallel fashion, enabling better air release. Furthermore, access between the plenums may be had from the sides of the line, facilitating cullet removal. As this invention is solely concerned with the production of bent and tempered glass sheets (i.e. not flat glass sheets), and it is preferable to bend the glass sheets so that the plane of curvature, or the greater curvature, as the case may be, is transverse to the direction of conveyance, it will be appreciated that the rectilinear rows of quench nozzles described in the prior art are no longer compatible with the desired arrangement of the plenums. Consequently, an important element of the present invention is the provision of rows of quench nozzles which extend along curved lines, and the curved lines may be curved in the planes of the plenums (which include the direction of elongation of the plenums) to form a three-dimensional quench. Suitably, the array of quench nozzles comprises rows of quench nozzles extending along lines which are curved in the direction of elongation of the plenums. The invention thereby provides a quench apparatus able to provide three-dimensional quenching suited to the bent glass sheets required to manufacture present-day glazings.

In this specification, the plane of curvature is regarded as being the plane in which the radii of curvature lie, and references to the direction or orientation of curvature are to be construed accordingly. Complex curvatures may be resolved into curvatures in two planes at right angles to each other.

Preferably, the rows of quench nozzles extend along lines which are curved to match the average local curvature of the bent glass sheet in the corresponding direction. Reference is made to "average local curvature" because it is normal to move a bent glass sheet while it is being tempered, and so the jet from a given quench nozzle will impinge on an extended area of the glass sheet, over which the curvature may vary to some extent.

Alternatively or additionally, the sheet may have a curvature in the direction of conveyance, and successive plenums in the direction of conveyance may be arranged so that their profile at the level of the nozzles is curved in the direction of conveyance. In this situation, it is preferable that the profile of the plenums is curved to match the average local curvature of the bent glass sheet in the direction of conveyance.

It is also preferable that the bent glass sheet is oscillated while being tempered. This results in a tempered glass sheet having improved fracture characteristics.

It will be appreciated that for optimised quenching efficiency, the quench nozzles need to be close to the surfaces of the bent glass sheet. However, when the bent glass sheet has significant curvature in its direction of movement, this may render it impossible for it to enter between the blastheads. Advantageously, therefore, the blastheads are arranged to be movable towards and away from each other, so that the gap between them may be increased. The blastheads may then be moved apart to allow the sheet to enter between them, moved back towards each other to achieve the desired separation for the quenching operation, and then moved apart again to allow the sheet to exit from between the blastheads.

If one considers the apparatus to have a centerline parallel to the direction of conveyance, then, advantageously, successive plenums of the lower blasthead are connected to each other by connecting surfaces which are inclined away from the centerline. This feature aids cullet removal, as cullet naturally tends to fall outwards from the centerline towards the sides of the apparatus under the action of gravity. Preferably, successive plenums of the upper blasthead are connected to each other by connecting surfaces which are inclined towards the centerline, i.e. in the opposite direction, so that, if one considers a transverse cross-section of the line, the opposed connecting surfaces of the upper and lower blastheads diverge away from the centerline and towards the sides of the line. Spent quench gas exhausts more easily with this arrangement, because it reduces the back pressure which would otherwise build up, and alleviates the recirculation of hot spent quench gas near the centerline of the apparatus.

Suitably, the quench nozzles are formed as bores in a nozzle bar, the outlets of the nozzles being level with a surface of the bar, at least one such bar being incorporated into each plenum at its face nearest to the path of conveyance of the bent glass sheet. Preferably the nozzle bores are formed by drilling the bar. It is advantageous for the outlets of the nozzles to be level with the surface of the bar, because the bar then presents a smooth surface towards the glass sheet being quenched, and broken glass is less likely to lodge on such a surface and affect air release or scratch the sheet. Moreover, such nozzle bars are less susceptible to damage than, for example, exposed tubular nozzles.

While such nozzle bars may be made of metal, as they commonly have been in the past, it has been found, surprisingly, that some non-metallic materials are also suitable, e.g. certain plastics materials, rubbers or machinable ceramic materials. Contrary to expectation, heat-resistant plastics materials and rubbers survive in this environment (i.e. despite the proximity of glass sheets initially at up to 650° C.), because they are cooled by the passage of quench gas through the nozzles; similarly, the jets of quench gas afford some protection from the abrasive effect of cullet, as they tend to cause cutlet to drop in-between the plenums. Suitable plastics materials are tough, machinable, materials which are heat-resistant to at least 120° C., preferably 150° C. Suitable rubbers have a similar degree of heat resistance. Examples include polytetrafluoroethene (known as PTFE for short), silicon rubber and a modified nylon sold under the name Eptalon™.

An example of a suitable machinable ceramic is the glass ceramic available under the name Macor™ from Corning, Inc. of New York, which comprises approximately 55% fluorophlogopite mica and 45% borosilicate glass. It will be appreciated that the hitherto unknown fabrication of quench nozzles in such non-metallic materials is applicable independently of the plenum orientation and nozzle configuration, and thus represents an invention which is quite separate from the invention claimed in the independent claims of this patent application.

Alternatively, the quench nozzles may take the form of tubes which may be cylindrical but need not be, conical or part-conical tubes being a possibility among other shapes. Such tubes may be mounted in a bar, or in sheet metal, amongst other ways of affixing them to the plenums.

With regard to the independent claims appended hereto, the invention also relates to a method of tempering a bent glass sheet, comprising conveying the sheet along a predetermined path through an apparatus according to claim 1 hereinafter, and quenching the sheet with diverging jets of quench gas, characterised by conveying the bent glass sheet transversely to the direction of elongation of the plenums, the diverging jets of quench gas issuing from an array of quench nozzles which is curved in at least one direction.

According to another aspect of the invention, a production line is provided for producing bent and tempered glass sheets, comprising a furnace for heating the glass sheets, a bending station, an apparatus according to any one of claims 1 to 12 hereinafter, an unloading station and a means of advancing the sheets along a predetermined path along the line.

The invention will now be further described in terms of the following non-limiting specific embodiments, which are illustrated with reference to the accompanying drawings in which:

FIG. 1 is schematic plan view of a production line for bending and tempering glass sheets, which includes an apparatus for tempering bent glass sheets according to the invention;

FIG. 2a is a side view of the apparatus of FIG. 1, and FIG. 2b is a detail from FIG. 2a, showing a variation in certain aspects;

FIG. 4 is a schematic perspective view of part of the apparatus of FIGS. 2 and 3;

FIG. 5 is a cross-section of a small part of the apparatus, the line of section being indicated on FIG. 1;

FIG. 6 is a plan view of part of a nozzle bar for use in the invention;

FIG. 7 is a front view of the nozzle bar of FIG. 6, showing a somewhat greater length of it;

FIG. 8 is a greatly enlarged cross-section of the nozzle bar of FIGS. 6 and 7, the line of section being indicated in FIG. 6;

FIG. 9 is a view corresponding to that of FIG. 8; showing a different embodiment of nozzle bar.

Figure 3:
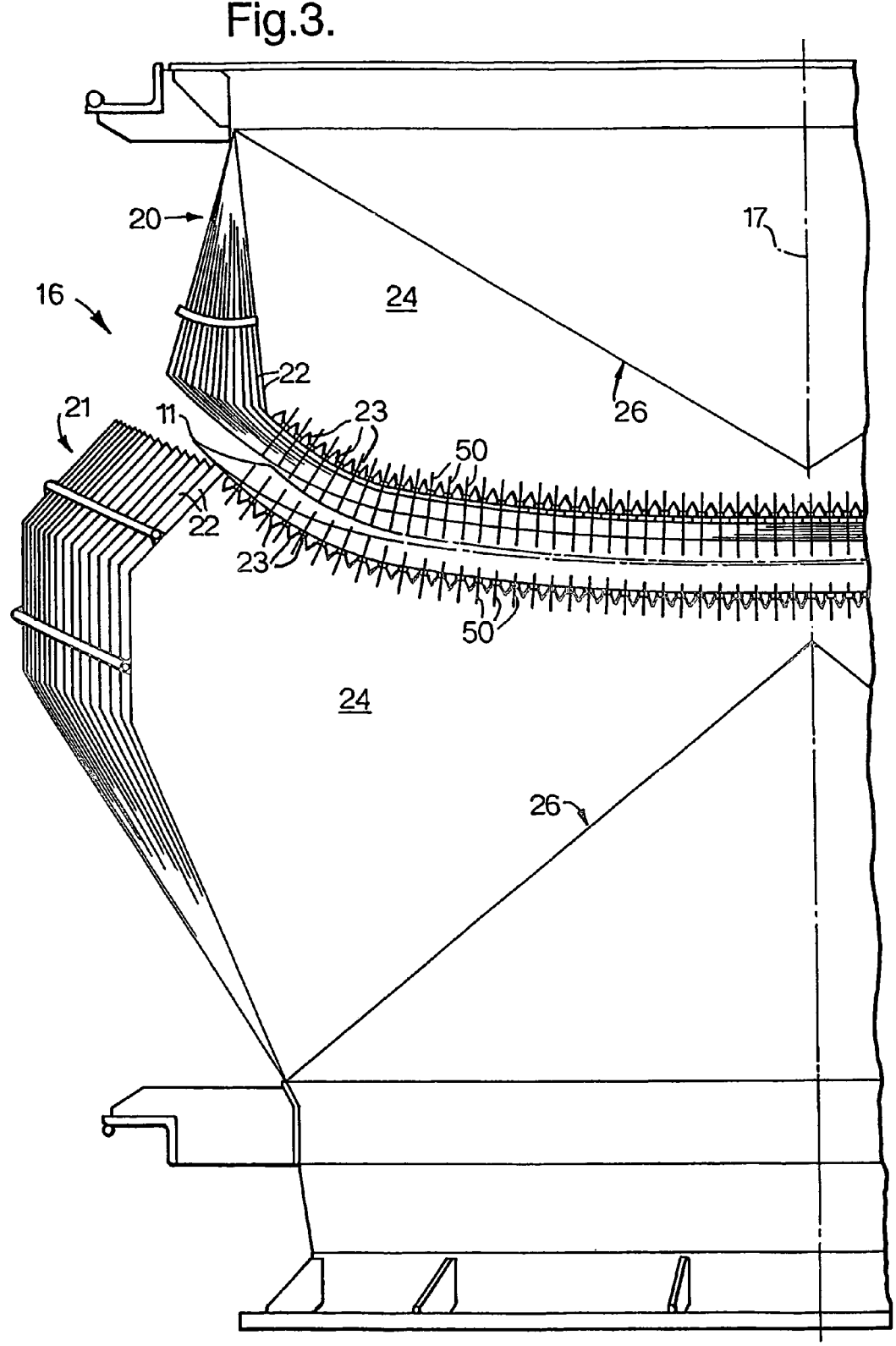
FIG. 3 is a front view of part of the apparatus of FIG. 2 shown somewhat enlarged.

Referring to FIG. 1, a production line 10 for bending and tempering glass sheets 11 is shown in highly schematic form. The line comprises a furnace 12 for heating the glass sheets, a bending station 13, a quench station 14 and an unloading station 15. The glass sheets are advanced along a predetermined path along the line by a conveyor 19, which may be a roller conveyor in whole or in part. Other means of conveying the sheets may be included, such as propelling the sheets while supported on a gas cushion, or a shuttle ring which moves between the bending station and the unloading station. The direction of movement is shown by arrow A, and is parallel to the centre line 17 of the apparatus. Variations of the basic layout of the line are possible; for example, the bending station may have one or more side exits, so that the overall line is in the shape of a letter "L" or "T", in which case references to the orientation of the plenums should be considered in relation to the direction of conveyance of the glass sheet through the quench station itself.

The glass sheets 11 are advanced on conveyor 19 into furnace 12 where they are heated to a temperature at which they become heat-softened, thereby enabling them to be deformed, e.g. bent to shape, within a timescale consistent with economic and efficient production.

Each sheet is then advanced into the bending station 13, which in some versions of the apparatus may be positioned within the furnace, or in any case heated to reduce the rate at which the heated glass sheet cools. A variety of bending techniques may be employed to bend the sheet to the desired shape, such as press bending, roll forming or drop forming, or a combination of these, possibly including sag bending.

After bending, the bent glass sheet is conveyed into the quench station 14, where it is tempered in an apparatus 16 according to the invention, which is more fully described hereinafter. Finally, the bent and tempered sheet is unloaded in the unloading station 15.

FIG. 2a illustrates quench apparatus 16 in rather more detail. The apparatus is viewed from the side of the line 10, and comprises a pair of blastheads for quenching each sheet with jets of quench gas. An upper blasthead 20 and a lower blasthead 21 are arranged in opposed relationship above and below the path of conveyance through the apparatus. Each blasthead 20, 21 comprises a plurality of spaced elongated plenums 22 which supply quench gas to rows of quench nozzles 23 (better illustrated in FIGS. 4 and 6) from which jets of quench gas issue.

Each plenum comprises spaced, generally parallel sidewalls 24 which extend in their height and width for distances which are large compared with the depth of the plenum (the depth being considered as the dimension corresponding to the separation of the plenum side walls). Accordingly, the plenums have the general shape of flat blades or fins. The nozzles are positioned at the lowermost end of the upper plenums, and at the uppermost end of the lower plenums, i.e. the ends adjacent the path along which the glass sheets are conveyed.

Fans (not shown) supply quench gas, normally air, through ducts (also not shown) to the upper and lower blastheads, the air being directed into the plenums. The air enters the upper blasthead from the top and the lower blasthead from the bottom. It then passes through the plenums, exits the nozzles and impinges on the bent glass sheet 11 in a predetermined pattern. The bent glass sheet 11 would normally be supported on a quench ring during tempering, but for reasons of clarity this has been omitted from FIG. 2a (and also FIG. 3).

As already mentioned, this invention relates solely to the tempering of bent glass sheets, and, as vehicle manufacturers demand ever thinner glazings for reasons of weight reduction, it is increasingly important to optimise the heat transfer efficiency of the quench apparatus. Many vehicle glazings are now specified at a thickness below 3 mm, and high cooling rates are required to temper such thin glazings to the required standard, e.g. ECE R43. As is known in the art, thinner glazings are more difficult to temper to a given standard than thicker ones, because much higher cooling rates are needed to create the required temperature differential between the surfaces of a glass sheet and its centre, when these points are in fact very close together owing to the reduced thickness of thin glass.

Several factors contribute to increased heat transfer efficiency of a quench apparatus. Of course, it is possible to increase the pressure at which quench gas (normally air) is supplied, but this requires more powerful fans, which increase both the capital and running costs of the apparatus. More cost-effective options include optimising quench nozzle designs, and careful control of the distance travelled by the quench gas between exiting the nozzle and impinging on the glass, i.e. the separation between the nozzles and the glass. Another important factor is the ease with which quench gas can be dispersed after it has impinged on the glass and abstracted heat from the glass surface. Such "spent" quench gas preferably exhausts the apparatus rapidly, and without any restrictions which would cause a back pressure to develop. While these factors enable thinner glass than previously to be toughened, they are also advantageous in the toughening of thicker glass, because the increased quenching efficiency results in cost savings.

The present invention seeks to increase the heat transfer efficiency of a quench apparatus by exploiting the above factors to advantage, as will be explained in the ensuing description. As already mentioned, the plenums are arranged to extend transversely of the direction of conveyance of the bent glass sheets for improved dispersal of spent quench gas. Moreover, measures have been taken to reduce the separation between the nozzles and the glass sheet.

A bent glass sheet may be curved in one direction only (cylindrical curvature) or in two directions at right angles to each other (complex curvature), where the curvature in one direction may be greater than that in the other direction. In either situation, the bent glass sheet may be conveyed with its curvature, or the greater of its curvatures, as the case may be, oriented in the direction of conveyance. Successive plenums in the direction of conveyance are arranged so that their profile at the level of the nozzles is curved in the direction of conveyance. For example, it can be seen from FIG. 2a that the plenums vary in height, so that the ends of the plenums which are adjacent the bent glass sheet follow its curvature. The distance between the quench nozzles 23 and the bent glass sheet 11 may thereby be reduced as much as is possible while still obtaining the desired impingement pattern on the sheet. Pairs of blastheads may be fabricated to match the curvature of each glazing to be produced.

It will be appreciated from purely geometrical considerations that, if the curvature in the direction of conveyance of a bent glass sheet exceeds the distance between blastheads, it will be impossible for the sheet to pass between the blastheads. A further desirable feature of the apparatus is that the blastheads are arranged to be movable towards and away from each other. In practice it is simplest to arrange for the upper blasthead to be movable relative to the lower one, and so a raising and lowering mechanism 25 is schematically indicated in FIG. 2a.

In FIG. 2a, a small number of lines 50 have been drawn to represent the position and direction of some of the jets of quench gas. The plenums 22 of the upper and lower blastheads 20, 21 of FIG. 2a are arranged to be directly opposite each other, and opposed quench jets impinge directly opposite each other onto opposite faces of the glass sheet 11. However, in FIG. 2b an alternative plenum arrangement is shown for comparison with FIG. 2a, which has certain advantages because of the resulting nozzle configuration.

FIG. 2b shows parts of a few plenums 22 together with a fragment of the glass sheet 11. The plenums of the upper and lower blastheads are now staggered, so that opposed quench jets represented by lines 50 are aligned with each other to be collinear, as are the corresponding nozzles. Once again, opposed jets impinge directly opposite each other onto opposite faces of the sheet, but this remains the case even if the sheet deviates slightly in the vertical direction from its intended position between the blastheads, thus making the quench apparatus more tolerant of slight variations in glass shape or thickness.

FIG. 3 is a front view of the left-hand half of the quench apparatus 16, as seen when looking along the centre line 17 of the line in the direction of arrow A in FIG. 1. The apparatus has left-right mirror symmetry about the centre line, and so the right-hand half corresponds to the left-hand half. It may clearly be seen how plenums 22 are curved in their direction of elongation, that is to say in a transverse or left-right direction. Each plenum bears a row of quench nozzles 23 extending along a line which is similarly curved in the direction of elongation of the plenums. A row of nozzles may comprise nozzles of different orientations (inclinations), or a plenum may bear two rows of nozzles, one row comprising nozzles inclined in one direction, and the other row comprising nozzles inclined in another direction. As it is desirable for reasons of air release to keep the space occupied by each plenum to a minimum, the rows should be close together where two separate rows of nozzles are used per plenum.

It is frequently the practice to oscillate the bent glass sheet while quenching it; the amplitude of oscillation may amount to 1½ times the pitch of the plenums, for example. This means that each jet of quench gas impinges on an elongate area of the glass sheet, over which the curvature may vary. Preferably the average local curvature of the line, along which the row of nozzles extends, matches the average local curvature of the bent glass sheet in the corresponding direction. Rectilinear oscillation of the sheet during quenching generates toughening stresses in the bent and tempered sheet which are non-uniform. On fracture, such non-uniform stresses result in an increased proportion of fracture lines which cross each other, preventing the formation of objectionable long splines which do not comply with safety standards.

The position and direction of the jets of quench gas are again schematically indicated in FIG. 3 by lines 50. It may be seen that the nozzles and hence jets of the upper and lower blastheads are aligned with each other also when viewed in the direction of conveyance of the glass sheets. The plenums of each blasthead are connected by inclined connecting surfaces 26 which are indicated in FIG. 3, but described in more detail in connection with FIG. 4 below.

Referring now to FIG. 4, there is shown a schematic perspective view of part of the lower blasthead 21. The tops of the plenums 22 are visible, as are the rows of nozzles 23, successive such rows constituting the array of nozzles referred to above; part of the array 40 is indicated in FIG. 4. It may be seen how successive plenums are connected to each other by connecting surfaces 26 which are inclined in a downward direction away from the centerline 17. The connecting surfaces bridge the gaps which would otherwise exist between pairs of adjacent plenums. The inclination of the connecting surfaces 26 improves the dispersal of spent quench gas and aids cullet removal, since gravity naturally causes cullet to tend to fall towards the outside of the line. In fact, the combination of the flow of spent quench gas along surfaces 26, together with the relatively wide spacing of the plenums and the effect of gravity, may result in such efficient cutlet removal that the blasthead can be said to be self-cleaning. When selecting the plenum spacing, heat transfer considerations should also be taken into account, as an excessive plenum spacing would adversely affect heat transfer. The connecting surfaces 26 may be planar or curved.

Successive plenums of the upper blasthead are connected to each other by a similar arrangement of connecting surfaces 26 (indicated in outline on FIG. 3), so that the connecting surfaces of the upper blasthead generally correspond to those of the lower blasthead when inverted. This may be seen from FIG. 3, where parts of the connecting surfaces of both blastheads are shown in outline. Successive plenums of the upper blasthead are accordingly connected to each other by connecting surfaces which are inclined towards the centerline 17. From FIG. 3, it is evident that the opposed connecting surfaces of the upper and lower blastheads diverge in a generally horizontal direction away from the centerline 17 and towards the sides of the line. The volume available for spent quench gas to exhaust through thereby increases towards the sides of the line, which ensures that back pressure is reduced. Air release, i.e. dispersal of spent quench air, is correspondingly improved.

Referring to FIG. 5, a cross-section of two adjacent plenums of the lower blasthead is shown to illustrate certain details more clearly. As before, the position and direction of the jets of quench gas are indicated by lines 50. These jets issue from quench nozzles 23 (FIGS. 4 and 6) which are provided in a curved nozzle bar 51 (FIG. 7). As will be evident from FIGS. 8 and 9, the quench nozzles are mutually inclined, and so the jets of quench gas diverge as indicated by lines 50. The nozzle bar 51 may be positioned between the sidewalls 24 of the plenum, at the end adjacent the path of conveyance of the glass sheet (i.e. at the top of the plenums of the lower blasthead, and at the bottom of the plenums of the upper blasthead). The nozzle bar may be positioned wholly between the sidewalls, as shown in FIG. 5, or it may be provided with a lip on each of its long sides, so that it locates on the plenum sidewalls (FIGS. 8 and 9); the latter construction is preferable when the nozzle bar is composed of non-metallic, especially plastic, material. A reasonably airtight seal is desirable between the nozzle bar and the sidewalls to avoid substantial loss of quench gas. The nozzle bar may be attached to the sidewalls by welding, bonding or riveting, the latter being preferred; rivets 52 are accordingly shown in FIG. 5.

FIG. 6 shows part of the nozzle bar 51 in plan view from above. Quench nozzles 23 are formed by drilling bores in the bar. Preferably, a single nozzle bar spans the full width of each plenum, but for fabrication reasons a number of shorter sections of bar may be used to span the plenum, provided that a reasonably airtight seal is achieved where adjacent sections of bar abut each other. The nozzle outlets are indicated by continuous circles, while the nozzle inlets, which are on the bottom face of the bar, are indicated by somewhat larger dashed circles, which are slightly offset with respect to the outlets. This is due to the chamfering of the inlets, which is described in more detail with regard to FIG. 8.

FIG. 7 is a front view of slightly more than half of the length of a typical nozzle bar 51. It is symmetrical about the centerline 17, so the other half corresponds. The nozzle bar is curved to match the curvature of the plenum in which it is fitted. Two nozzles 23 are shown in phantom, although obviously the actual bar is provided with spaced nozzles along its entire length.

The nozzle bar may be made in metal, in which case the bar is preferably cut from a block of metal and machined to the appropriate curvature, following which the nozzles are drilled. Alternatively the bar may be made in a suitable non-metallic material, i.e. one which is heat- and abrasion-resistant, and machinable, such as PTFE or the modified nylon sold as Eptalon™. Such materials are advantageous, not least because they can easily be bent to shape to suit the curvature of each plenum. Machining costs are thereby considerably reduced. As mentioned earlier, certain machinable ceramics are also suitable, as are certain heat-resistant rubbers.

FIG. 8 shows a greatly enlarged cross-section of the nozzle bar of FIGS. 6 and 7, the line of section passing through a nozzle 23, having an inlet 83 and an outlet 84. The position and directions of the jets of quench gas are again shown by lines 50 which correspond to the axes of respective nozzles; the right-hand line as illustrated indicating the jet which issues from the actual nozzle shown, and the left-hand line indicating a jet from another nozzle, which is inclined in the opposite direction to the one shown. Preferably, alternating nozzles are inclined in opposite directions, and the nozzles of adjacent nozzle bars are aligned, so that the so-called "domino 5" pattern is achieved, i.e. the points of impingement of the jets on the glass sheet correspond to the spots on the number five domino piece, repeated over the sheet. That is, the jet impingement points are positioned at the intersections of a square grid, with a further impingement point at the centre of each square, these further points forming a second square grid overlaying the first. This pattern, together with appropriate oscillation of the sheet during quenching, has been found to yield an optimised fracture pattern for tempered glass. Careful calculation of nozzle position in terms of pitch, distance from the glass sheet and angle of inclination is required in order to produce a regularly repeating impingement pattern on the glass, despite varying curvature of the glass and hence the nozzle bar. Nozzle bars of the upper blasthead have tighter radii of curvature and smaller nozzle pitches than the bars of the lower blasthead.

Preferably, at least some of the nozzles have profiled bores. For instance, the nozzles may be chamfered at their inlet ends 83, i.e. whereas the bore of each nozzle 23 has a cylindrical section 80 leading to the outlet 84, it has a conical section 81 leading from the inlet 83, and the transition from one section to the other may be gradual, e.g. the bore may be smoothed to avoid a sharp internal edge. All these measures reduce pressure losses through the nozzles, and hence result in greater efficiency. An alternative nozzle configuration need not include a cylindrical section at all, the bore comprising a series of conical sections, in which the angle of taper of the bore (i.e. the angle subtended at the vertex of an imaginary cone which is tangential to the bore at the point at which the angle of taper is to be determined) may vary along its length, e.g. from a large taper at the inlet to a small taper at the outlet. There may be continuous variation in the angle of taper along the length of the bore. The lips 82 which locate the bar on the plenum sidewalls are also visible in FIG. 8, and the outlets 84 are level with the upper (as illustrated) surface 85 of the bar, i.e. they do not protrude from the bar.

The length of the nozzle (as measured along the axis of the bore) exceeds its diameter at the outlet end, and may approach approximately twice the diameter. This provides well-defined quench jets, without incurring excessive frictional losses, which increase running costs. Well-defined quench jets allow the blastheads to be positioned further from the surfaces of the glass sheet while still achieving the desired heat transfer rate and quench pattern. This in turn yields better optical quality and makes day-to-day operation of the apparatus easier.

FIG. 9 is a cross-section of an alternative embodiment of nozzle bar 90, the view corresponding to that of FIG. 8. The upper surface 91 of this bar is arranged, as far as possible, to be perpendicular to the axes 50 of the mutually inclined nozzles 92. That is, the upper surface itself comprises two mutually inclined surfaces which meet at an apex along the centerline 93 of the nozzle bar 90. This enables the wall of the cylindrical section 94 to be of identical height around virtually the whole of the circumference of the bore, thereby providing better definition to the quench jet. Conical section 95 is unchanged, and the nozzle outlets are still level with the upper surface 91 of the bar in the sense that they do not protrude from it.

Bearing in mind the comments made in connection with FIG. 8 above regarding the need for accurately calculated nozzle positions, it has been found in practice that the parameters calculated for suitable nozzle geometries lie within the following parameter ranges:

| | |
|---|---|
| Inclination of nozzle (to vertical): | 7°-20°, preferably 10° to 16°. |
| Diameter of nozzle outlets: | 4-10 mm, preferably 6-8 mm. |
| Nozzle pitch along bar: | 15-30 mm, preferably 20-25 mm. |
| Plenum spacing (from centres): | 30-60 mm, preferably 40-50 mm. |
| Length of nozzle (on axis): | 6-16 mm, preferably 9-13 mm. |

It has already been explained that the bent glass sheet to be tempered may have curvature in just one direction, or in two directions at right angles to each other. While the quench apparatus of the invention may be adapted to handle bent glass sheets in any generally horizontal orientation, it is simpler to align the sheets with their curvature, or major curvature as the case may be, at right angles to the direction of conveyance or centerline of the production line. The sheet will then be flat, or have only minor curvature, in the direction of conveyance. Many vehicle glazings are elongated in one direction, and it is in fact the case for certain glazings, e.g. rear windows, that the major curvature is in the direction of elongation, being so-called "wrap" curvature. Accordingly, for such glazings it is preferable that the means of conveying the sheet is adapted to convey the sheet in a direction perpendicular to its direction of elongation, and that the direction of elongation of the plenums 22 is parallel to the direction of elongation of the sheet 11, as illustrated in FIG. 1. The apparatus may also be readily adapted for other glazings such as side glazings or roof glazings where the major curvature is not necessarily in the direction of elongation.

The invention is applicable both to production lines in which a shuttle ring is used to transport the bent glass sheet through the quench station, and also to lines in which the bent glass sheet is transported through the quench station on rollers. In the latter case, account should be taken of the presence of rollers within the array of quench nozzles, especially the effect on air release.

The invention claimed is:

1. An apparatus for tempering a bent glass sheet, comprising means for conveying the bent glass sheet along a predetermined path through the apparatus, and a pair of blastheads for quenching the bent glass sheet with jets of quench gas, the blastheads comprising upper and lower blastheads arranged in opposed relationship above and below the predetermined path, each blasthead comprising a plurality of spaced elongate plenums for supplying quench gas to an array of quench nozzles from which the jets of quench gas issue, each plenum possessing a longitudinal centerline extending along a longitudinal extent of the plenum, each nozzle possessing an axis, each plenum bearing one or two rows of quench nozzles, successive such rows constituting the array of quench nozzles, the length of the quench nozzles exceeding their diameter, and the quench nozzles of each plenum being inclined so that the axes of some of the nozzles of each plenum are inclined to one side of the plenum relative to a vertical plane containing the longitudinal centerline of the plenum and the axes of others of the nozzles in each plenum are inclined towards an opposite side of the plenum relative to the vertical plane containing the longitudinal centerline of the plenum to provide diverging jets of quench gas, wherein each of the plenums extends transversely to the direction of conveyance of the bent glass sheet, thereby affording side access between adjacent pairs of plenums, and each array of quench nozzles is curved in at least one direction, the apparatus possessing a centerline parallel to the direction of conveyance, and successive plenums of the lower blasthead are connected to each other by connecting surfaces which are positioned between and connected to the successive plenums, the connecting surfaces being inclined downwards away from the centerline.

2. An apparatus as claimed in claim 1, wherein the one or two rows of quench nozzles constituting the arrays extend along lines which are curved in the direction of elongation of the plenums.

3. An apparatus as claimed in claim 2, wherein the one or two rows of quench nozzles extend along lines which are curved to match the average local curvature of the bent glass sheet and are curved in a direction that is the same as the bent glass sheet.

4. An apparatus as claimed in claim 1, wherein successive plenums in the direction of conveyance are arranged so that their profile at the level of the nozzles is curved in the direction of conveyance.

5. An apparatus as claimed in claim 4, wherein the profile of the plenums is curved to match the average local curvature of the bent glass sheet in the direction of conveyance.

6. An apparatus as claimed in claim 4, wherein the blastheads are arranged to be movable towards and away from each other.

7. An apparatus as claimed in claim 1, wherein the quench nozzles are formed as bores in a nozzle bar, the outlets of the nozzles being level with a surface of the bar, at least one such bar being incorporated into each plenum at its end nearest to the path of conveyance of the bent glass sheet.

8. An apparatus as claimed in claim 7, wherein the bores are part cylindrical and part conical, the conical part being at the inlet end.

9. An apparatus as claimed in claim 8, wherein the length of the cylindrical part of the bore is equal to or greater than the length of the conical part.

10. An apparatus as claimed in claim 7, wherein the bar is non-metallic.

11. An apparatus as claimed in claim 7, wherein the bar is composed of polytetrafluoroethene.

12. An apparatus as claimed in claim 7, wherein, for each nozzle bar, immediately adjacent nozzles are inclined in opposite directions.

13. A method of tempering a bent glass sheet, comprising conveying the sheet along a predetermined path through a tempering apparatus, and quenching the sheet with diverging jets of quench gas, the bent glass sheet being conveyed transversely to the direction of elongation of the plenums, and the diverging jets of quench gas issuing from an array of quench nozzles which is curved in at least one direction; wherein the tempering apparatus comprises means for conveying the bent glass sheet along a predetermined path through the tempering apparatus, and a pair of blastheads for quenching the bent glass sheet with jets of quench gas, the blastheads comprising upper and lower blastheads arranged in opposed relationship above and below the predetermined path, each blasthead comprising a plurality of spaced elongate plenums for supplying quench gas to an array of quench nozzles from which the jets of quench gas issue, each plenum possessing a longitudinal centerline extending along a longitudinal extent of the plenum, each nozzle possessing an axis, each plenum bearing one or two rows of quench nozzles, successive such rows constituting the array of quench nozzles, the length of the quench nozzles exceeding their diameter, and the quench nozzles of each plenum being inclined so that the axes of some of the nozzles of each plenum are inclined to one side of the plenum relative to a vertical plane containing the longitudinal centerline of the plenum and the axes of others of the nozzles in each plenum are inclined towards an opposite side of the plenum relative to the vertical plane containing the longitudinal centerline of the plenum to provide diverging jets of quench gas, wherein each of the plenums extends transversely to the direction of conveyance of the bent glass sheet, thereby affording side access between adjacent pairs of plenums, and each array of quench nozzles is curved in at least one direction, the tempering apparatus possessing a centerline parallel to the direction of conveyance, and successive plenums of the lower blasthead are connected to each other by connecting surfaces which are positioned between and connected to the successive plenums, the connecting surfaces being inclined downwards away from the centerline.

14. A method of tempering a bent glass sheet as claimed in claim 13, comprising moving the blastheads apart to allow the sheet to enter between them, moving the blastheads towards each other for the quenching operation, and moving them apart again to allow the sheet to exit from between the blastheads.

15. A method as claimed in claim 13, wherein the bent glass sheet is elongate in one direction, comprising conveying the sheet with its direction of elongation perpendicular to the direction of conveyance and parallel to the direction of elongation of the plenums.

16. A method as claimed in claim 13, wherein the jets of quench gas are arranged to impinge on the glass sheet in a "domino 5" pattern.

17. A method as claimed in claim 13, wherein the toughening stresses generated in the bent and tempered glass sheet are non-uniform.

18. A production line for producing bent and tempered glass sheets, comprising a furnace for heating the glass sheets, a bending station, a tempering apparatus, an unloading station and a means of advancing the sheets along a predetermined path along the line; wherein the tempering apparatus comprises means for conveying the bent glass sheet along a predetermined path through the tempering apparatus, and a pair of blastheads for quenching the bent glass sheet with jets of quench gas, the blastheads comprising upper and lower blastheads arranged in opposed relationship above and below the predetermined path, each blasthead comprising a plurality of spaced elongate plenums for supplying quench gas to an array of quench nozzles from which the jets of quench gas issue, each plenum possessing a longitudinal centerline extending along a longitudinal extent of the plenum, each nozzle possessing an axis, each plenum bearing one or two rows of quench nozzles, successive such rows constituting the array of quench nozzles, the length of the quench nozzles exceeding their diameter, and the quench nozzles of each plenum being inclined so that the axes of some of the nozzles of each plenum are inclined to one side of the plenum relative to a vertical plane containing the longitudinal centerline of the plenum and the axes of others of the nozzles in each plenum are inclined towards an opposite side of the plenum relative to the vertical plane containing the longitudinal centerline of the plenum to provide diverging jets of quench gas, wherein each of the plenums extends transversely to the direction of conveyance of the bent glass sheet, thereby affording side access between adjacent pairs of plenums, and each array of quench nozzles is curved in at least one direction, the tempering apparatus possessing a centerline parallel to the direction of conveyance, and successive plenums of the lower blasthead are connected to each other by connecting surfaces which are positioned between and connected to the successive plenums, the connecting surfaces being inclined downwards away from the centerline.

19. An apparatus for tempering a bent glass sheet, comprising means for conveying the bent glass sheet along a predetermined path through the apparatus which follows a centerline of the apparatus, and a pair of blastheads for quenching the bent glass sheet with jets of quench gas, the blastheads comprising upper and lower blastheads arranged in opposed relationship above and below the predetermined path, the lower blasthead comprising a plurality of spaced elongate plenums for supplying quench gas to an array of quench nozzles from which the jets of quench gas issue, each plenum bearing one or two rows of quench nozzles, successive such rows constituting the array of quench nozzles, each plenum possessing a longitudinal centerline extending along a longitudinal extent of the plenum, each nozzle possessing an axis, the length of the quench nozzles exceeding their diameter, and the quench nozzles of each plenum being mutually inclined so that the axes of some of the nozzles of each plenum are inclined to one side of the plenum relative to a vertical plane containing the longitudinal centerline of the plenum and the axes of others of the nozzles in each plenum are inclined towards an opposite side of the plenum relative to the vertical plane containing the longitudinal centerline of the plenum to provide diverging jets of quench gas, each of the plenums extending transverse to a direction of conveyance of the bent glass sheet and the plurality of plenums being arranged in spaced apart relation to one another so that a gap exists between adjacent pairs of the plenums to afford side access between the adjacent pairs of the plenums, each array of quench nozzles being curved in at least one direction, the adjacent pairs of plenums comprising two first plenums positioned in spaced apart adjacent relation to one another with a first gap between the two first plenums, the adjacent pairs of plenums comprising two second plenums positioned in spaced apart adjacent relation to one another with a second gap between the two second plenums, the first plenums being connected to one another by first connecting surfaces positioned in the first gap between the first plenums, the first connecting surfaces extending at an incline downwardly away from the centerline to facilitate cullet removal, the second plenums being connected to one another by second connecting surfaces positioned in the second gap between the second plenums, the second connecting surfaces extending at an incline downwardly away from the centerline to facilitate cullet removal.

* * * * *